(No Model.) 5 Sheets—Sheet 1.
A. MOONELIS.
MACHINE FOR CUTTING WRAPPERS FOR CIGARETTES.
No. 514,239. Patented Feb. 6, 1894.
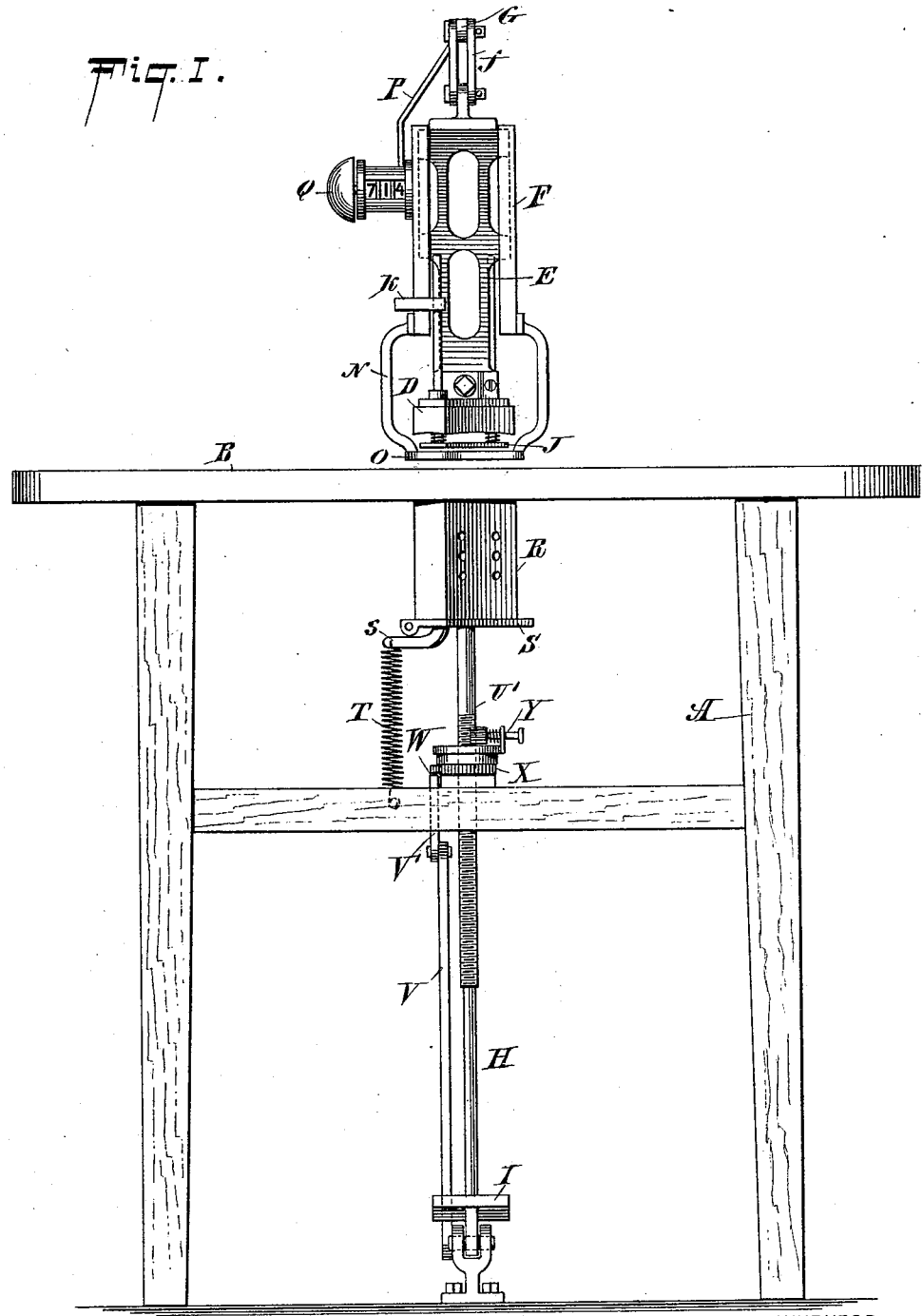
Fig. I.
WITNESSES:
William Goebel.
M. V. Bidgood
INVENTOR
Adolf Moonelis
BY
ATTORNEYS.

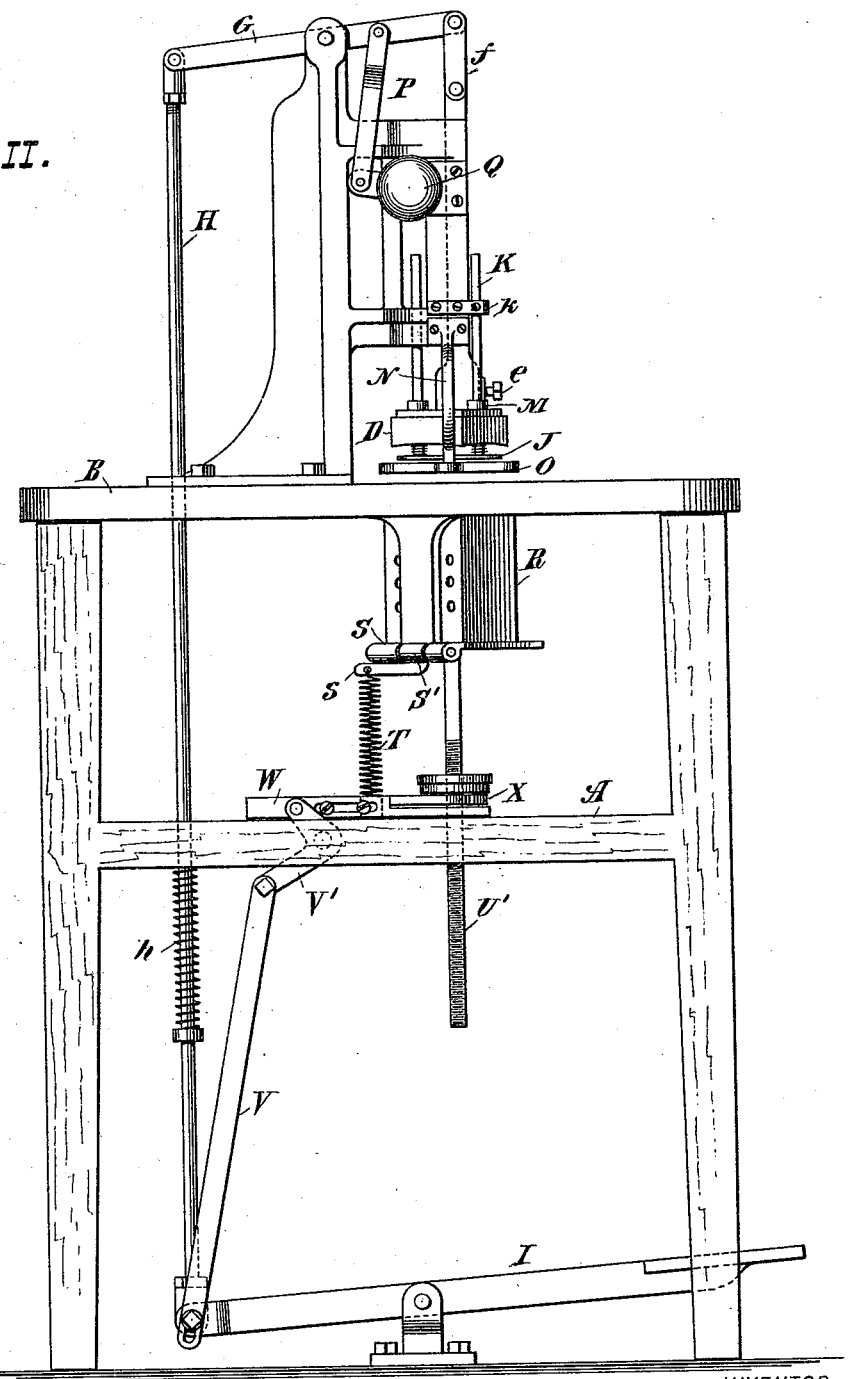

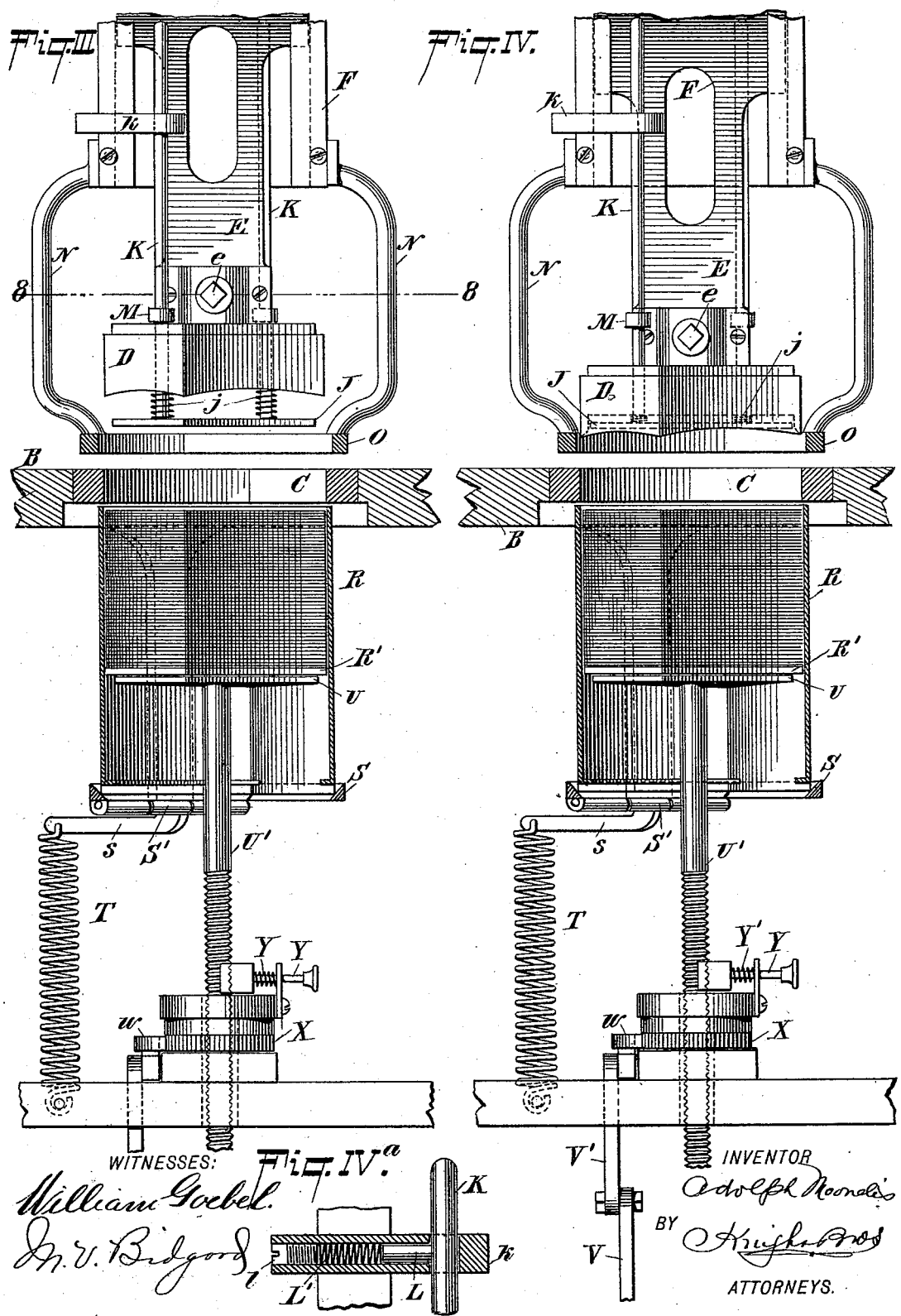

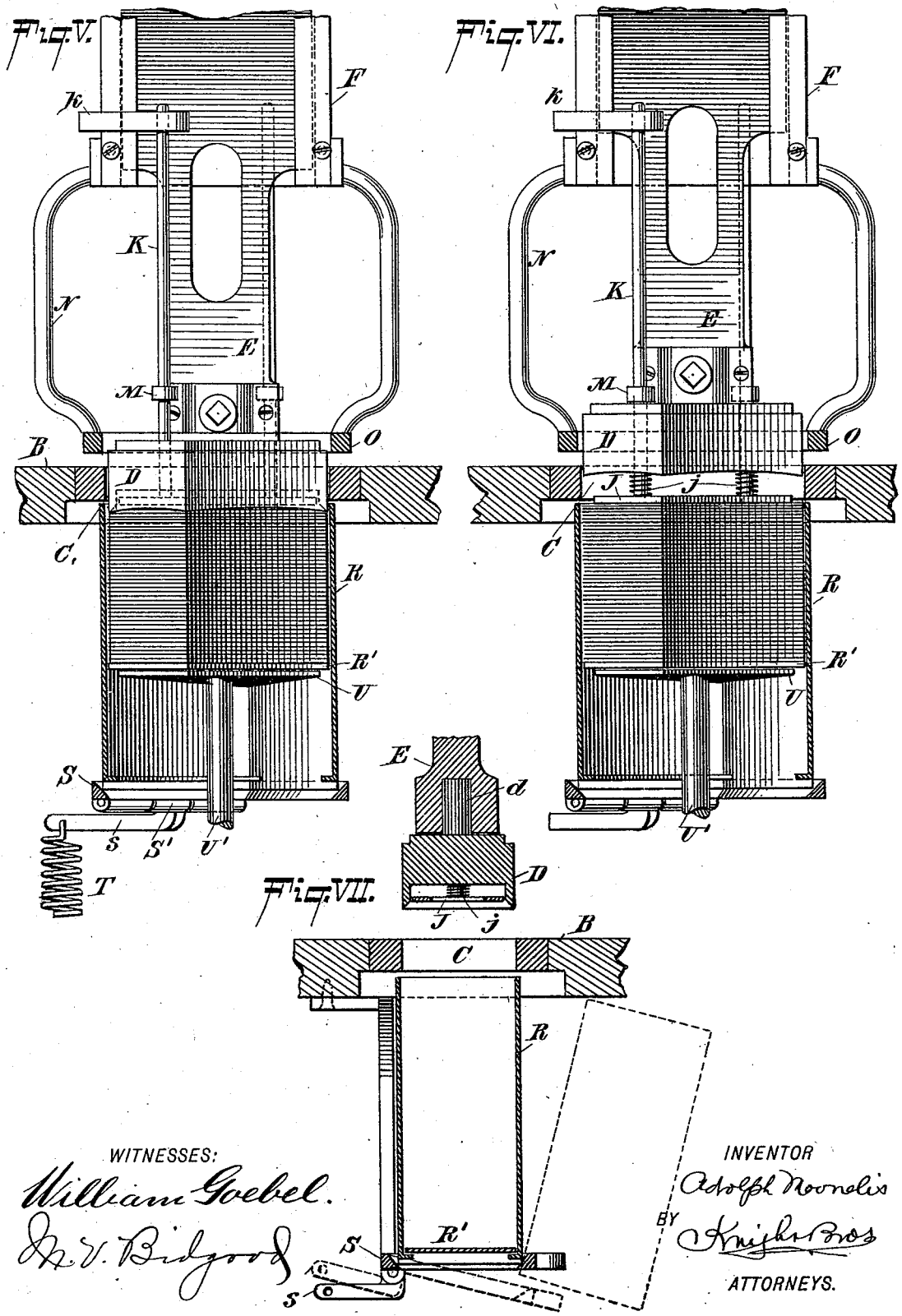

(No Model.) 5 Sheets—Sheet 5.
A. MOONELIS.
MACHINE FOR CUTTING WRAPPERS FOR CIGARETTES.
No. 514,239. Patented Feb. 6, 1894.
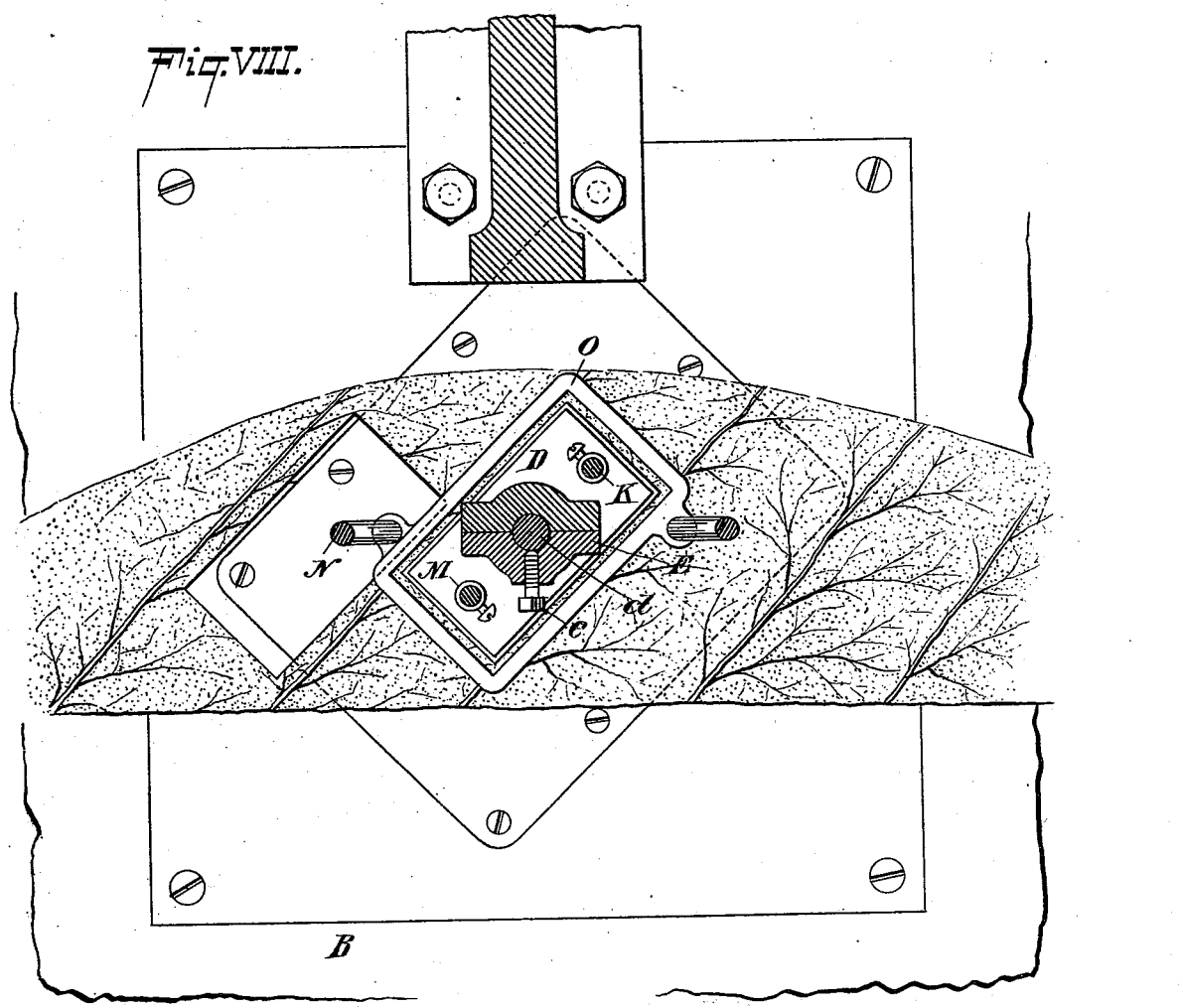
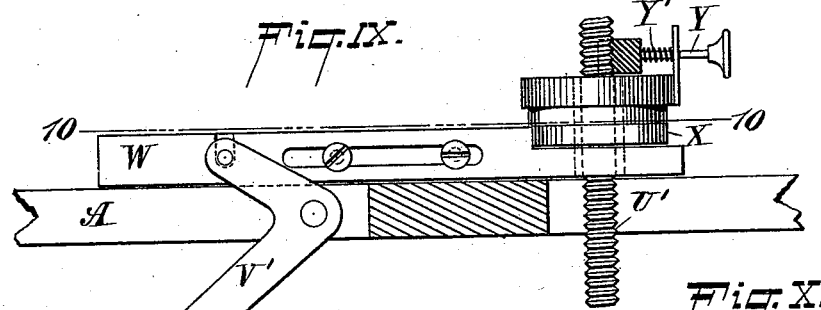
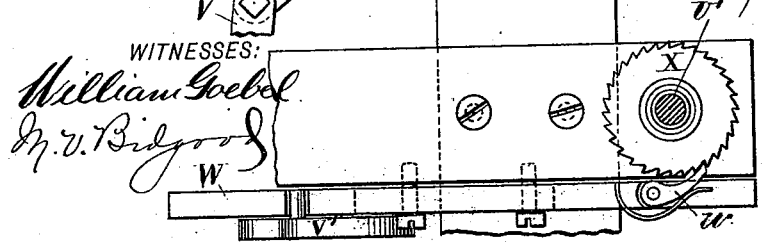
WITNESSES:
INVENTOR
BY
ATTORNEYS.

UNITED STATES PATENT OFFICE.

ADOLPH MOONELIS, OF NEW YORK, N. Y., ASSIGNOR TO THE INTERNATIONAL CIGARETTE MACHINERY COMPANY, OF SAME PLACE.

MACHINE FOR CUTTING WRAPPERS FOR CIGARETTES.

SPECIFICATION forming part of Letters Patent No. 514,239, dated February 6, 1894.

Application filed December 19, 1892. Serial No. 455,670. (No model.)

*To all whom it may concern:*

Be it known that I, ADOLPH MOONELIS, a citizen of the United States, residing in the city, county, and State of New York, have invented certain new and useful Improvements in Machines for Cutting Wrappers for Cigarettes, of which the following is a specification.

My invention is particularly designed to cut wrappers from tobacco leaves, such wrappers being intended for use in connection with what are known as all-tobacco cigarettes. The machine can also be utilized for the cutting of wrappers for cheroots. In two former applications, filed in the United States Patent Office, to wit, application Serial No. 432,270, filed May 9, 1892, and application Serial No. 435,841, filed June 7, 1892, I have shown, described and claimed certain constructions adapted to carry my ideas into effect with more or less economy, and my present invention is an evolution of the inventions therein set forth, the particular improvements consisting in certain essential re-arrangement and re-construction of the more important working parts, as will be explained. The cutting of the wrappers for cigarettes is essentially different from the cutting of wrappers for cigars; the latter requires a more or less irregular wrapper, while the former to make a good cigarette requires a four-cornered right-angled, and preferably oblong, wrapper, and it is desirable and in fact necessary to so cut these wrappers from the tobacco leaves as that the seams or veins, and more particularly the principal vein, shall lie in a line parallel with the longer edge of the wrapper so that when the wrapper is rolled around the bunch or filling the seam or vein will by pressure be incorporated in the body of the cigarette without danger of breakage, which latter incident will occur if there is any attempt to press the vein or seam into the body of the article crosswise of the cigarette. My former applications have been directed to securing the desirable ends above set forth, and my present invention is a further outcome of my experiments, which I will now proceed to describe in connection with the accompanying drawings which form a part of the specification.

Figure I is a front elevation of my improved cigarette wrapper cutter, the parts being shown in their normal position. Fig. II is a side elevation of the same. Fig. III is a front elevation partly in section of the machine or a portion thereof in the position of rest, as shown in Figs. I and II. Fig. IV is a similar view after the cutter hereinafter referred to has been given a preliminary downward movement. Fig. IV$^a$ is a detailed view hereinafter referred to. Figs. V and VI are views similar to Figs. III and IV, showing different positions of the cutting apparatus. Fig. VII is a cross-section of the rectangular cutter and the wrapper holding box. Fig. VIII is a plan view partly in section of the machine drawn on the line 8, 8, Fig. III. Figs. IX and X are detailed views; the latter being a cross-section on the line 10—10 Fig. IX.

In the drawings A represents a stand or table having a top B, the said table being provided with an opening C set at an angle to the front edge of the table, as shown in Fig. VIII, and in this respect it resembles the construction described in my former applications above referred to. This opening C is located, as stated, in the table top B, the periphery of the opening being provided with a cutting edge to co-operate with the vertically moving rectangular cutter D. This cutter D is mounted in a vertically moving frame E and is secured to such frame by means of the screw-bolt $e$, the cutter D being provided with an upward extension $d$, as shown in Fig. VIII. The frame E moves in ways or guides of the main or stationary frame F, as shown in Fig. I, and is connected at its upper end to link $f$. The link $f$ is swiveled to a locking lever G, see Fig. II, and the lever G in turn is swiveled to the vertically moving rod H. The latter is pivoted at its lower end to a treadle I, and is provided with a returning spring $h$, as shown in Fig. II, for the purpose of withdrawing the working parts to their normal position after the pressure upon the treadle I has been removed by the operator. A downward pressure upon the treadle I will throw the rod H in an upward direction and the frame E in a downward direction. This movement of the frame E will carry the rectangular cutter D with it. The leaf tobacco, as shown in Fig. VIII, is fed beneath the cutter, the main or central seam being directed in a line parallel with the front of the table by the operator so that the tributary seams or veins will lie on a line approximately parallel with the main or longer edge of the rectangular cutter D and the complementary opening and cutting edge C of the table, so that when the cutter descends and severs the wrapper from the leaf, the leaf can be conveniently fed to the next position without in any way interfering with the direction of its travel and securing a thorougly efficacious mode of operation and the most desirable form of wrapper. I also provide in connection with the cutter and located within it, an ejecting or discharging plate J. This ejecting-plate is provided with two upwardly extending supporting-arms or rods K, said arms having bearings in the brackets $k$, one on each side of the machine. These brackets are shown in detailed view in Fig. IV$^a$. It is desirable to have, and I provide, a friction contrivance in connection with these two parts, consisting of a plug L, whose position against the supporting-arm K is controlled by the spring L' and the screw-plug $l$. By this means more or less friction is created upon the side of the supporting-arm K and its movement vertically in relation to the cutting-table and other moving parts is controlled thereby, as will be explained.

Springs $j$ are interposed between the ejecting-plate J and the cutter D, whereby normally, as shown in Fig. III, the ejecting-plate J will be held at a distance from the cutter. Adjustably located stops M are also provided on the support-arms K and above the cutter, so that when the cutter in its upward movement comes in contact with the stops, the arms K will be carried up with the cutter.

At N I show a stationary permanent guard, consisting of two arms, one arranged on each side of the machine, attached to and extending downwardly from the main frame F and terminating in a rectangular guard-ring O. The object of this construction is to provide a secure means of preventing the operator's hands coming in contact with the cutter in its descent toward and through the opening in the table. The opening in the guard O is sufficient to permit the descent of the cutter D and the inclosed ejecting-plate J therethrough. Pivoted to the rocking lever G is an arm P which operates a registering device Q, so that every descent of the cutter will cause the register Q to turn, thereby efficiently keeping an accurate account of the wrappers cut.

Located beneath the table is a box or receptacle R adapted to hold any pre-determined number of wrappers, such as five hundred or one thousand, as may be preferred. This box or receptacle is supported on a tilting frame S, as shown in Fig. VII. This tilting frame is hinged at S' and is provided with an arm $s$, to the outer end of which is secured a spring T which keeps the frame in its normal horizontal position, while the box or receptacle is in position for receiving the wrappers. When, however, the box is full, the operator by drawing it forwardly and downwardly, as shown in Fig. VII, is enabled to tilt the frame S slightly, permitting its easy removal. The receptacle R is provided also with a movable bottom R' which when the receptacle is empty would be located near the top thereof, and would be supported by a follower-plate U. The follower-plate U is attached to a spindle U', the latter extending downwardly and being provided with screw-plate, as shown in Figs. III and IV. These parts are also shown in detail in Figs. IX and X.

Connected to the treadle I is an arm V, having at its upper end, and swiveled to it, a bell-crank-lever V', the latter being pivoted in the table A of the machine, and the shorter branch of the bell-crank-lever V' being pivoted to a slide W. This slide carries a pawl $w$, controlled by a spring, as shown in Fig. X, and adapted to operate a ratchet-wheel X. When the treadle is operated, therefore, the wheel X, through the mediation of the intermediate working parts, will be turned, and the spindle U' will be fed downwardly.

A pin Y, provided with a spring Y' is shown for permitting the spindle U' to drop.

While I have described a rectangular cutter, which is especially adapted for cutting cigarette wrappers, it is evident that the shape of the cutter can be changed, as desired and can be irregular for cutting cigar wrappers, and I wish the claims to be read accordingly.

Having thus described my invention, the following is what I claim as new therein and desire to secure by Letters Patent:

1. In a machine for cutting the wrappers of cigarettes, the combination of a frame, a vertically moving rectangular cutter carried thereby, a table having an opening for the passage of said cutter, the edges of said opening co-acting with said cutter, the stationary guard fixed around said cutter and a spring controlled discharge or ejecting plate located within and adapted to travel with said cutter as set forth.

2. In a machine for cutting the wrappers of cigarettes, the combination of the vertically moving rectangular cutter, the discharge or ejecting-plate arranged to pass within and normally located at a distance from the cutter and adapted to travel downwardly with it, said plate having upwardly extending rods, friction guides to receive said rods and means for restoring the plate to its elevated position, as set forth.

3. In a machine for the cutting of wrappers of cigarettes, the combination of the vertically moving rectangular cutter, a spring controlled ejecting-plate and a tension device through which the arms of the ejecting-plate extend, as set forth.

4. In a machine for the cutting of cigarette wrappers, the combination of the cutter, the ejecting-plate J, having the arms K and the tension device $k$, L, L', $l$, as set forth and shown.

5. In a machine for cutting the wrappers of cigarettes, the combination of the cutter, the complementary opening in the table through which the cutter extends, and a box or receptacle for receiving the wrappers and a tilting support for said receptacle, as set forth.

6. In a machine for cutting the wrappers of cigarettes, the combination of the cutter, the ejecting-plate, the table B, having a knife-edged opening C and a box or receptacle beneath the table, as set forth.

7. In a machine for cutting the wrappers of cigarettes, the combination of wrapper cutting dies with a receptacle R and a hinged frame S carrying said receptacle, as set forth.

8. In a machine for cutting the wrappers of cigarettes, the combination of the receptacle R, having a follower arranged as shown, and means for operating the same with a hinged frame, supporting said receptacle as and for the purpose set forth.

9. In a machine for cutting wrappers, the combination of cutting dies with a receptacle beneath them, a hinged frame for supporting said receptacle, means for holding said frame upward, means for holding the receptacle in position, a follower and means for actuating the latter, substantially as described.

ADOLPH MOONELIS.

Witnesses:
HERBERT KNIGHT,
LIZZIE WOOLSEY.